United States Patent [19]

Lowe et al.

[11] Patent Number: 4,663,383

[45] Date of Patent: May 5, 1987

[54] SILICA COATED OLEFIN-ACID COPOLYMER MOLDING PELLETS

[75] Inventors: David J. Lowe, Wilmington, Del.; Richard J. Powell, Orange; Malcolm S. Smith, Beaumont, both of Tex.

[73] Assignee: E. I. Du Pont de Nemours and Company, Wilmington, Del.

[21] Appl. No.: 832,726

[22] Filed: Feb. 25, 1986

[51] Int. Cl.$^4$ .............................................. C08K 3/34
[52] U.S. Cl. ................................... 524/493; 528/490
[58] Field of Search ......................... 524/493; 528/490

[56] References Cited

U.S. PATENT DOCUMENTS

| | | | |
|---|---|---|---|
| 3,035,002 | 5/1962 | Brasure et al. | 524/493 |
| 3,463,751 | 8/1969 | Hasegawa et al. | 524/232 |
| 3,595,827 | 7/1971 | Foster | 524/230 |
| 3,909,467 | 9/1975 | Tatum | 260/8 |
| 4,411,951 | 10/1983 | Barsotti | 524/493 |
| 4,533,509 | 8/1985 | Gust et al. | 524/493 |

FOREIGN PATENT DOCUMENTS

| | | | |
|---|---|---|---|
| 0759417 | 5/1971 | Belgium | 524/493 |
| 52-77136 | 6/1977 | Japan | 524/493 |

*Primary Examiner*—Joseph L. Schofer
*Assistant Examiner*—N. Sarofim

[57] ABSTRACT

Ethylene copolymers or terpolymers containing repeating units derived from ethylenically unsaturated carboxylic acids which have been surface treated with from 0.005 to 2 wt. % silica to reduce surface tackiness are disclosed.

9 Claims, No Drawings

SILICA COATED OLEFIN-ACID COPOLYMER MOLDING PELLETS

BACKGROUND OF THE INVENTION

1. FIELD OF THE INVENTION

The present invention relates to pellets of copolymers of a lower olefin and an ethylenically unsaturated carboxylic acid which have been surface treated with a low level of finely divided silicone dioxide. The thus treated pellets exhibit dramatically increased tack resistance as measured by the stick temperature test.

2. PRIOR ART

U.S. Pat. No. 3,909,487 discloses the treatment of fine particles of ethylene/ethylenically unsaturated carboxylic acid copolymers or corresponding ionomers with silane-treated fumed silica. The polymers are rough, spherical particles of 100 mesh or finer, preferably 10-100 μm diameter. 0.1-0.5% by weight of hydrophobic aliphatic silane treated silicone dioxide is added to the polymer. This amount of silica is rather high on a wt % basis, compared to the current invention, but rather low on a g/m$^2$ basis. The adhesion of the composition to glass is improved by the presence of the silica. There is no disclosure of reduced tackiness of the polymer.

U.S. Pat. No. 3,595,827 discloses a composition of acid-containing copolymers with 0.02-2.0% amide wax ("amphiphatic compound") and 0.01-2% synthetic amorphous silica. The silica is not used as a surface treatment. It may be added by melt extrusion, for example, and is not dusted onto the polymer. It is disclosed that the silica particles provide channels through the bulk of the material which permits the wax to rapidly migrate to the surface. The patent states that use of silica alone (without the wax) "has at best an insignificant effect." Only amorphous silica can be used—many other types do not work.

U.S. Pat. No. 3,463,751 discloses the use of a wide variety of antisticking agents (including silica) in E/VA copolymers which may contain up to 20% methacrylic acid. The actual antisticking agent is a mixture of PVC powder with a second agent, such as silica. "It is essential to use the polyvinyl chloride powder together with the antisticking agent. If the use of either of them is omitted, there is scarcely effective for the purpose of the present invention." The copolymer which is treated is in the form of a disperison, in contrast to the present invention, which is preferable for the treatment of pellets.

SUMMARY OF THE INVENTION

The present invention relates to the discovery that the tack resistance of ethylene polymers containing an acid group is dramatically increased by 20° to 30° C. by treating the surface of the polymer with a low level such as 0.025 wt % of silicone dioxide powders.

DETAILED DESCRIPTION

The polymers used in this invention are addition copolymers of an α-olefin containing up to 10 carbon atoms and an α,β-ethylenically unsaturated carboxylic acid having from 3-8 carbon atoms. This includes monocarboxylic, dicarboxylic acids and half esters, amides, and nitriles of dicarboxylic acids.

The preferred α,β-unsaturated acids used have at least one free acid group and the structure

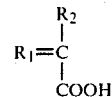

wherein R$_1$= is selected from the group consisting of

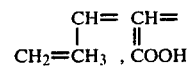

and

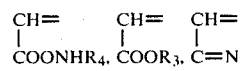

and —R$_2$ is selected from the group consisting of —H, —CH$_3$, —C$_2$H$_5$, —CONHR$_4$, —COOR$_3$, —C N, —CH$_2$COOH, —CH$_2$CONHR$_4$, and —CH$_2$—C N, wherein —R$_3$ is an alkyl containing from 1 to 10 carbon atoms and —R$_4$ is —R$_3$, or —H. These α,β-unsaturated acids include acrylic acid, methacrylic acid, ethacrylic acid, itaconic acid, maleic acid, fumaric acid, monoesters of said dicarboxylic acids, such as methyl hydrogen maleate, methyl hydrogen fumarate, and ethyl hydrogen fumarate, half amides such as β-carboxy acrylamide and half nitriles, β-cyano acrylic acid preferably acrylic acid or methacrylic acid. The proportion of α,β-unsaturated carboxylic or dicarboxylic acid may range from 2 to 50 wt. percent, preferably 3 to 20 wt. percent, and most preferably 4 to 15 wt. percent of monomer in the total polymer composition.

The copolymer base need not necessarily comprise a two component polymer. Thus, although the olefin content of the copolymer should be at least 50 wt. percent, more than one olefin can be employed to provide the hydrocarbon nature of the copolymer base. Preferably at least 25 wt. percent of the polymer should be ethylene. Additionally, any third copolymerizable monomer can be employed in combination with the olefin and the carboxylic acid comonomer. The scope of base copolymers suitable for use in the present invention is illustrated by the following examples: ethylene/acrylic acid copolymers, ethylene/methacrylic acid copolymers, ethylene/itaconic acid copolymers, ethylene/methyl hydrogen maleate copolymers, ethylene/maleic acid copolymers, include ethylene/n-butyl acrylate/methacrylic acid, ethylene/i-butyl acrylate/methacrylic acid, ethylene/acrylic acid/methyl methacrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/methacrylic acid/vinyl acetate copolymers, ethylene/acrylic acid/vinyl alcohol copolymers, ethylene/propylene acrylic acid copolymers, ethylene/styrene/acrylic acid copolymers, ethylene/methacrylic acid/acrylonitrile copolymers, ethylene/fumaric acid/vinyl methyl ether copolymers, and ethylene/vinylidene chloride/acrylic acid copolymers.

Preferred three component copolymers are those which contain at least 60 weight percent α-olefin having from 2 to 10 carbon atoms, from 2 to 10 mole percent α,β-unsaturated carboxylic acid, and up to 48 mole percent of a monomer copolymerizable therewith. Suitable third monomers for use in three component copolymers are preferably "vinyl alcohol", vinyl acetate, and monomers having the structure

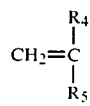

wherein —$R_5$ is selected from the group consisting of —H, —CH, and Cl, and $R_6$ is selected from the group consisting of —$R_5$, phenyl, —C N, —$OR_7$, and —$COOR_7$ wherein —$R_7$ is an alkyl radical having up to 10 carbon atoms. Most preferred third monomers include n-butyl acrylate and isobutyl acrylate.

The acid groups in the polymer are 0 to 90% neutralized with metal ions. In particular, the mono- and divalent ions of metals in Groups I-A, I-B, II-A, II-B, IV-A and VII of the Periodic Table of Elements (see page 392, Handbook of Chemistry and Physics, Chemical Rubber Publishing Co., 37th Edition) are suitable ionic linking metal ions. Preferred metal ions include $Na^+$, $K^+$, $Li^+$, $Mg^{+2}$, $Ca^{+2}$, $Sr^{+2}$, $Ba^{+2}$, $Pb^{+2}$, and $Zn^{+2}$. The most preferred: $Na^+$, $Zn^{++}$. It is not essential that only one metal ion be employed in ionically linking the copolymer, and more than one metal ion may be preferred in some instances.

The invention is not limited to pellets but also applies to films and other shapes. Pellets may be of the normal size encompassed by the term "pellet". A broad range might be 0.4–18 g/100 pellets (1–7 mm spheres). Normal pellets range from 1–5 g/100 pellets (2.7–4.6 mm), usually 2–4 g/100 (3.4–4.2 mm). Pellet size does not have an important effect on the invention. Smaller pellets can be cooled more quickly than large pellets, but tend to block more readily, but that is a feature inherent to pellets, and not directly related to the invention.

The pellets may be either freshly cut or aged. Freshly cut pellets tend to have a lower "stick temperature" (see below), and thus the addition of the silica is often more important for them.

The range for the amount of silica for treating average particles is 0.005–2 wt. %; preferably 0.01–1 wt. %; most preferably 0.02–0.05 wt. %.

Alternatively, the amount of silica may be expressed in terms of grams per surface area. Low levels of silica are preferable for providing pellets which have improved resistance to sticking without introduction of large amounts of silica into the composition. However, the use of larger amounts of silica (about 0.1 to 1.0 wt. %) is useful for some applications. We have found, for example, that pellets of the acid containing polymers coated with about 0.2% silica do not melt and flow together, even when heated to 240° C. for long periods of time. Thus it is possible to use this invention to provide pellets, films, or other extruded or molded shapes which have dramatically improved high temperature properties, such as heat distortion temperature.

Thus an average 4 mm diameter spherical particle weighs about 0.0335 g and has a surface area of $5 \times 10^{-5} m^2$. Coating with 0.025% silica corresponds to 0.17 g/$m^2$. Thus a broad range is 0.034–13.4 g/$m^2$, preferably 0.067–6.7 g/$m^2$, most preferably 0.13–0.34 g/$m^2$. This is a more general representation for pellets as well as films, shaped articles, etc.

The size of the silica particles is not known to be particularly important. The particle size should be less than about 100 μm with particle sizes of 0.004 to 5 μm being preferred.

The large increase (20°–30° C.) in the pellet stick temperature of acid containing ethylene polymers with the surface addition of low loadings (0.025 weight %) of silica powder is unexpected and is an important parameter. A low silica level is an advantage because:

(1) There is little, or no effect on resin end-use physical properties,
(2) Contamination of production blender facilities is minimized, and
(3) Customer storage area contamination is minimized.

Increase in the stick temperature of the polymer is the chief measure of the effectiveness of the invention. The invention can most obviously be applied to polymers which have a stick temperature near room temperature. But polymers with even a high stick temperature will have their tackiness at elevated temperatures reduced. Thus stick temperature of the polymer should not be a limitation. Generally the invention is applicable with polymers having stick temperatures of from 10° to 100° C.

The stick temperature is defined as the maximum temperature at which all the polymer pellets empty from the test apparatus in less than one minute following holdup under fixed conditions. To measure the stick temperature, polymer pellets are placed in a vertical tube having inside diameter of 3.9 cm and length of 23.2 cm lined loosely with a 5-mil (0.13 mm) thick film of poly(ethylene terephthalate) (Mylar ® 500D, Du Pont Co.). A 4086 g weight is placed on top of the pellets, so that the downward pressure is 33.5 kPa. Hot air is passed upward through the pellets at 23.5 L $cm^3$/min for 15 min. followed by air at ambient temperature for 5 minutes. The weight is then removed, and the tube is inverted. Time during which all the pellets flow out of the tube is noted. The test is repeated at gradually increasing temperatures until a point is reached when only a portion of the copolymer pellets or none of the pellets flow out of the tube. The stick temperature is the last temperature at which all the pellets flowed out in less than one minute.

The stick temperature of a given copolymer will to some extent depend on the size and shape of the pellets. Smaller, nonspherical pellets block more readily than larger, spherical pellets. Therefore, it is important to run a control experiment for each stick temperature determination.

In addition, the stick temperature is affected by other factors, such, for example, as the particular pelletizing technique and equipment and subsequent handling.

Melt index, density, etc. of the polymer are only important to this invention in that they may affect the stick temperature of the resin.

Several processes can be used to prepare the products of the present invention. In one process a known weight of pellets is added to a plastic bag. To the pellets is added the required amount of silica or other additive. The bag is sealed and shaken for about 2 minutes to distribute the additive uniformly over the pellets.

In another process, the silica is added to the top of a blender. One good method of addition is to add the silica to the pellets as they are being transferred to the blender. Mixing is accomplished by the blending action.

In another process, the silica is added to the pellet surface via melt cutter water. A mixture of silica in water can be prepared and used as the melt cutter water. The dried pellets retain a coating of silica.

The temperature of blending is not important over the normal pellet handling temperature range, about 10° to 60° C. The optimum blend time is a function of many variables and should be obvious to someone skilled in the art.

UTILITY

The ability to increase the tack resistance of ethylene copolymers and terpolymers containing acid groups, such as ionomers and ethylene/n-butyl acrylate/methacrylic acid polymers with low levels of silicone dioxide powders, permits these resins to be purged at higher temperatures and packaged in hopper cars (when possible) with no effect on physical properties. A reduction in "fines" generated from abrasion of particles and "snakeskins" arising from polymer deposits on metal surfaces can also result. This technology can improve the handling of higher acid resins.

The tack resistance of ethylene polymers having no acid group is not significantly affected by the addition of low levels of the silicone dioxide powders to the pellet surface. The surface addition of other small particle size powders such as aluminum silicate an calcium carbonate at these low levels had little or no effect on the tack resistance of ethylene polymers with or without an acid group.

EXAMPLES

In the Examples, the dry blending of the silica with the pellets was accomplished by shaking the proper weights of pellets and silica in a sealed bag for about 2 minutes at room temperature (23° C).

EXAMPLE 1

Commercial, aged pellets of a copolymer containing 85 wt. % repeating units derived from ethylene and 15 wt. % repeating units derived from methacrylic acid having a melt index of 60 were dry blended with various loadings of amorphous hydrated silica having an average particle size of 0.019 micron and a surface area of 140 square meters per gram, and the stick temperature was obtained for each blend. The results are reported in Table I below.

TABLE I

| Run | Silica Wt. % | Stick Temperature °C. |
|---|---|---|
| A | 0.000 | 40 |
| B | 0.010 | 50 |
| C | 0.025 | 72 |
| D | 0.050 | 72 |
| E | 0.100 | 72 |
| F | 0.250 | 80 |

As can be seen a plateau of 72° C. was reached with 0.025 wt. % which was unchanged through 0.1 wt. %.

EXAMPLE 2

The commercial copolymer pellets used in Example 1 were re-extruded and pelletized on an underwater melt cutter. As in Example 1, the freshly prepared pellets were dry blended with various levels of the same amorphous hydrated silica. The results are reported in Table II below.

TABLE II

| Run | Silica Wt. % | Stick Temperature °C. |
|---|---|---|
| G | 0.000 | 24 |
| H | 0.025 | 72 |
| I | 0.050 | 72 |
| J | 0.100 | 72 |
| K | 0.250 | 87 |

The stick temperature of the freshly prepared pellets was 24° C. compared to 40° C. for the packaged control of Example 1. The stick temperature of commercially produced pellets is around 24° C. as produced, but increases to around 40° C. due to pellet roughening, aging and residual volatiles loss. 0.025 wt. % silica increased the stick temperature to 72° C., an increase of 48° C. over the control. Results were similar to those observed in Example 1.

EXAMPLE 3

Commercial, aged pellets of a copolymer of 90 wt. % repeating units derived from ethylene and 10 wt. % repeating units derived from methacrylic acid with 71% of the acid units neutralized with zinc and having a melt index of 1.1 were dry blended with the amorphous hydrated silica used in Example 1 at various loadings. The results are reported in Table III.

TABLE III

| Run | Silica Wt. % | Stick Temperature °C. |
|---|---|---|
| L | 0.000 | 39 |
| M | 0.010 | >41 |
| N | 0.025 | 55 |
| O | 0.250 | >71 |

EXAMPLE 4

Commercial, aged pellets of a copolymer containing 91 wt. % repeating units derived from ethylene and 9 wt. % repeating units derived from methacrylic acid having a melt index of 10 were dry blended with various loadings of the silica used in Example 1. The results are reported in Table IV.

TABLE IV

| Run | Silica Wt. % | Stick Temperature °C. |
|---|---|---|
| P | 0.00 | 48 |
| Q | 0.025 | 75 |
| R | 0.250 | >80 |

EXAMPLE 5

The copolymer pellets used in Example 1 were dry blended with 0.025 wt. % of other silicas. Silica 1 is fumed silica having an average particle size of 0.008 micron and a surface area of 325 $m^2/g$. Silica 2 is fumed silica having an average particle size of 0.014 micron and a surface area of 200 $m^2/g$. Silica 3 is a fully hydrated silica having an average particle size of 0.21 micron and a surface area of 150 $m^2/g$. Silica 4 is an amorphous hydrated silica having an average particle size of 0.08 micron and a surface area of 30 $m^2/g$. The results are reported in Table V.

TABLE V

| Run | Silica, type | Stick Temperature °C. |
|---|---|---|
| S | 1 | 68 |
| T | 2 | 70 |
| U | 3 | 71 |
| V | 4 | 59 |

EXAMPLE 6

The copolymer pellets used in Example 3 were dry blended with 0.025 wt. % of the other silicas described in Example 5. The results are reported in Table VI.

TABLE VI

| Run | Silica, type | Stick Temperature °C. |
|---|---|---|
| W | 1 | 65 |
| X | 2 | 58 |
| Y | 3 | 51 |
| Z | 4 | 53 |

EXAMPLE 7

The copolymer pellets of Example 4 were dry blended with 0.025 wt. % of the silicas described in Example 5. The results are reported in Table VII.

TABLE VII

| Run | Silica, type | Stick Temperature °C. |
|---|---|---|
| AA | 1 | 66 |
| AB | 2 | 70 |
| AC | 3 | 67 |
| AD | 4 | 70 |

EXAMPLE 8

Pellets of a terpolymer containing 73.7 wt. repeating units derived from ethylene, 16.5 wt. % repeating units derived from n-butyl acrylate and 9.8 wt. % repeating units derived from methacrylic acid, having a melt index of 23 was dry blended with 0.025 wt. % of the silicas described in Example 5 and the silica used in Example 1 (Silica 5). Run AJ is a control with no silica. The results are reported in Table VIII.

TABLE VIII

| Run | Silica, type | Stick Temperature °C. |
|---|---|---|
| AE | 1 | 62 |
| AF | 2 | 55 |
| AG | 3 | 64 |
| AH | 4 | 55 |
| AI | 5 | 63 |
| AJ |   | 47 |

EXAMPLE 9

Pellets from a copolymer containing 95.6 wt. % repeating units derived from ethylene and 4.4 wt. % repeating units derived from methacrylic acid having a melt index of 8.0 were tested and found to have a stick temperature of 63° C. Additional pellets of this copolymer were dry blended with 0.025 wt. % of the silica used in Example 1 and found to have a stick temperature of 78° C.

EXAMPLE 10

Pellets from a copolymer of 91 wt. % ethylene and 9 wt. % methacrylic acid, 18% neutralized with zinc, were coated with 0.2 wt. % amorphous, hydrated silica, with particle size 0.019 micrometers, by dry blending. A portion of pellets so treated were placed into a shallow pan and heated to 240° for 2 hours under a nitrogen purge in a radiant tubular oven. Upon removal from the oven, the pellets had substantially retained their initial shape, and had not flowed significantly. Although the pellets had fused together at the places where they touched each other, the resulting agglomeration was friable. When the same polymer without treatment with silica is subjected to heating under these conditions, the pellets melt and flow into a pool.

We claim:

1. A normally solid addition polymer containing at least 25 weight percent repeating units derived from ethylene, at least 50 weight percent units derived from an α-olefin containing 2–10 carbon atoms, from 2 to 50 weight percent repeating units derived from an ethylenically unsaturated carboxylic acid containing 3 to 8 carbon atoms with from 0 to 90 percent of the carboxylic acid groups neutralized with metal ions, which has on its surface a coating consisting essentially of 0.034 to 13.4 g/m$^2$ of silica having a particle size of from 0.004 to 5 μm provided that the amount of the silica surface coating is from about 0.005 to about 2 weight percent of the polymer.

2. The polymer of claim 1 in the form of pellets weighing from 0.4 to 18 grams per 100 pellets.

3. The polymer pellets of claim 2 wherein the carboxylic acid derived repeating units are derived from acrylic acid or methacrylic acid.

4. The polymer pellets of claim 3 wherein up to 90 percent of the acid groups are reacted with metal ions.

5. The polymer pellets of claim 4 wherein pellets have from 0.067 to 6.7 g/m$^2$ of silica on their surface.

6. The polymer pellets of claim 5 wherein the pellets have from 0.13 to 0.34 g/m$^2$ of silica on their surface.

7. The polymer pellets of claim 5 wherein the polymer is a terpolymer of ethylene, butyl acrylate and 4–15 weight percent methacrylic acid or acrylic acid.

8. The polymer pellets of claim 7 wherein the polymer contains from 8 to 12 weight percent methacrylic acid or acrylic acid.

9. The polymer pellets of claim 8 wherein the metal ions are zinc or sodium.

* * * * *